United States Patent [19]

Parmann

[11] Patent Number: 4,847,094
[45] Date of Patent: Jul. 11, 1989

[54] APPARATUS FOR FORMING AN END PORTION OF A PLASTIC PIPE

[75] Inventor: Gunnar Parmann, Alvoen, Norway

[73] Assignee: Forsheda AB, Forsheda, Sweden

[21] Appl. No.: 107,782

[22] Filed: Oct. 13, 1987

[30] Foreign Application Priority Data

Oct. 15, 1986 [SE] Sweden .................... 8604364-3

[51] Int. Cl.$^4$ ........................... B29C 57/04
[52] U.S. Cl. ................... 425/107; 264/249;
264/294; 425/393; 425/DIG. 218
[58] Field of Search ............ 264/249, 264, 318, 294,
264/326; 425/392, 393, DIG. 218, DIG. 107,
107, DIG. 50, 254, DIG. 242; 29/809

[56] References Cited

U.S. PATENT DOCUMENTS

| | | | |
|---|---|---|---|
| 2,996,782 | 8/1961 | Kovach et al. | 425/254 |
| 3,110,931 | 11/1963 | Kadel | 425/107 |
| 3,851,369 | 12/1974 | Eschholz | 29/809 |
| 3,855,687 | 12/1974 | Moriguchi et al. | 29/809 |
| 3,893,794 | 7/1975 | Acda | 425/393 |
| 4,204,823 | 5/1980 | Hayes et al. | 425/393 |
| 4,230,270 | 10/1980 | Paret | 425/107 |
| 4,234,301 | 11/1980 | Hayes et al. | 425/392 |
| 4,379,115 | 4/1983 | Seach et al. | 425/DIG. 218 |
| 4,403,938 | 9/1983 | Seach et al. | 425/393 |
| 4,457,886 | 7/1984 | Acda et al. | 264/249 |

Primary Examiner—Richard L. Chiesa
Assistant Examiner—Khanh P. Nguyen
Attorney, Agent, or Firm—Jeffers, Hoffman & Niewyk

[57] ABSTRACT

An apparatus for forming an end portion of a plastic pipe wherein the end portion is transferred to softened state and the end portion is provided with an internal groove by axially displacing the pipe end portion in relation to a mould ring which is thereby introduced into the pipe end portion. After the forming of the pipe end portion the mould ring is left in the pipe end portion for forming a sealing ring therein. During the forming operation the pipe end portion is supported on a mandrel. In accordance with the invention the mould ring is displaced into the pipe end portion by displacing the ring along the mandrel while the pipe end portion is in its softened condition supported by the mandrel substantially without being displaced along the mandrel.

11 Claims, 7 Drawing Sheets

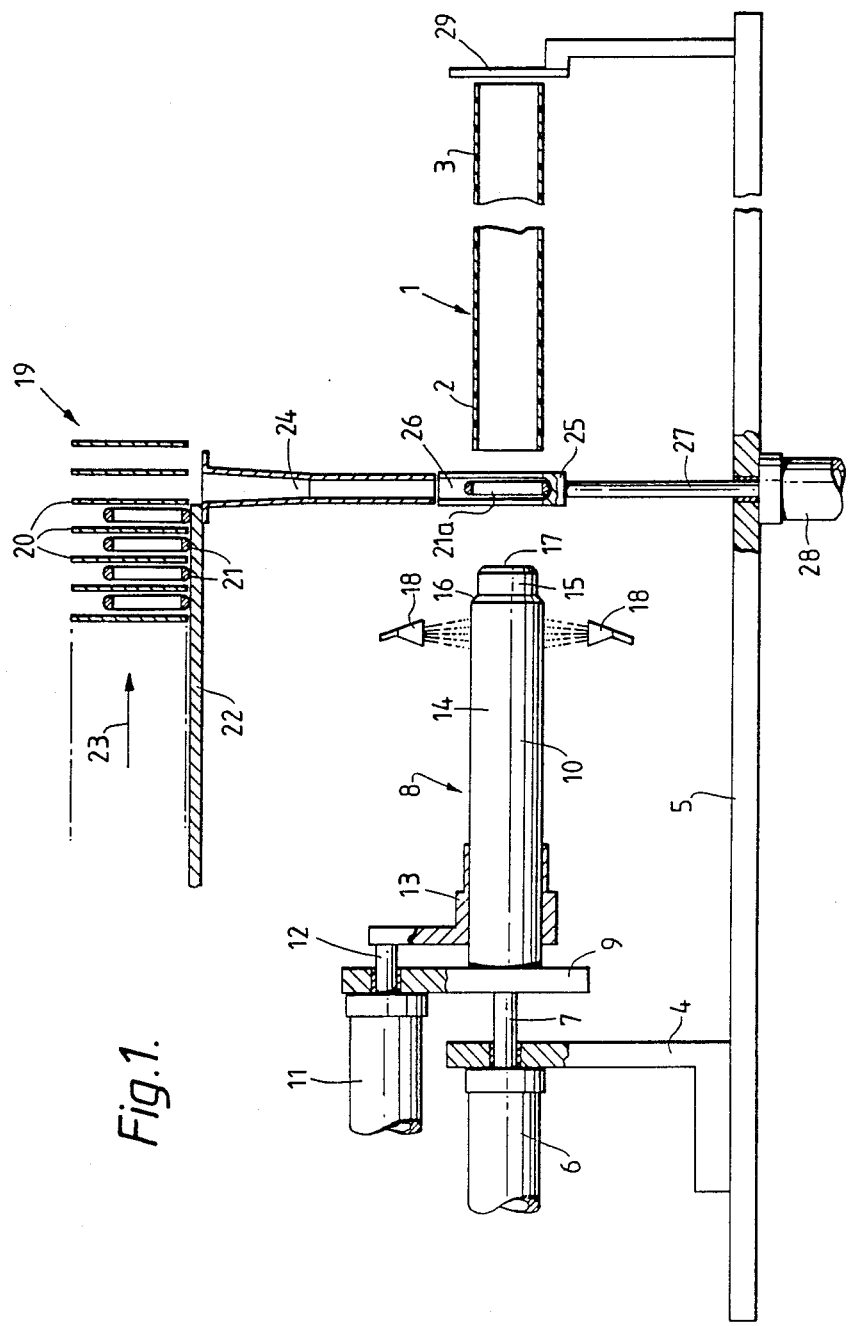

4,847,094

APPARATUS FOR FORMING AN END PORTION OF A PLASTIC PIPE

BACKGROUND OF THE INVENTION

The present invention to a method and a machine for forming an end portion of a plastic pipe.

It is previously known to provide an end portion of a plastic pipe with a sealing ring positioned in an internal groove in the pipe end portion by transferring the pipe end portion into a softened state and by introducing the sealing ring into the softened pipe end portion by relative movement between the sealing ring and the pipe end portion. Thereby, the sealing ring acts as a mould element for forming the groove for the sealing ring which after the forming operation is left in the groove in a locked-in position. When conducting the described forming operation the sealing ring is in a first operational step positioned on a mandrel on which the sealing ring is axially fixed by means of a support sleeve. The softened pipe end portion is then pushed over the mandrel and over the sealing ring which is axially fixed on the mandrel. Thereby, the softened pipe end portion conforms to the peripheral surface of the mandrel previously covered by the support sleeve, whereupon the pipe end portion is transferred to a solid state by cooling and is removed from the mandrel with the sealing ring remaining in the groove formed by the ring itself.

Previously known methods for forming an end portion of a plastic pipe in which a sealing ring is located in the end portion of the pipe comprise rather many operational steps and are time consuming. Thus, there are required several forming machines for matching an extruder in which the plastic pipes are manufactured.

Another drawback of the prior art methods is the difficulty of avoiding deformation of the pipe end portion and the adjacent section of the pipe when the softened pipe end portion is pushed over the mandrel and the sealing ring positioned thereon. Thus, the forming unit consisting of the mandrel and the sealing ring provides a relatively great resistance against the axial pushing movement in turn requiring that relatively great axial forces are exerted on the pipe. This may cause that the pipe wall is deformed for example to a corrugated shape.

SUMMARY OF THE INVENTION

The object of the invention is to provide a method and a machine for forming an end portion of a plastic pipe in which the basic technique can be utilized without being accompanied by the above drawbacks.

In order to comply with this object there is according to the invention provided a method of forming an end portion of a plastic pipe in which the end portion is transferred into a softened state and is provided with an inner groove by means of a mould ring while said end portion is displaced in relation to the mould ring, the mould ring being left in the groove after the forming of the pipe end portion for constituting a sealing ring therein, the method being characterized in that the mould ring is displaced into the pipe end portion by being moved along the mandrel while the pipe end portion is in its softened condition supported on the mandrel substantially without being displaced in relation thereto.

In a preferred embodiment of the method according to the invention the pipe end portion is formed to a socket by being displaced to the position supported on the mandrel after having been transferred to the softened condition, whereupon the mould ring is displaced into the socket by being moved along the mandrel.

Because of the fact that the mould ring is displaced into the pipe end portion while this is supported on the mandrel without being axially displaced thereon the softened pipe end portion will be subjected to substantially less axial forces than in utilizing the technique previously known. When the pipe end portion shall be formed for constituting a groove for receiving the mould ring and also for constituting a socket having a larger diameter than the pipe the forming operation is conducted in two steps, the first step comprising radial expansion of the pipe end portion for forming the socket by axially connecting the softened pipe end portion with the mandrel and the second step comprising displacement of the mould ring into the radially expanded pipe end portion while this is supported by the mandrel without being axially displaced in relation thereto. Due to the reduction of the axial forces exerted on the pipe end portion for conducting the forming operation there is provided reduced risk of deformation of the pipe end portion and there is also provided a possibility of using more thin-walled plastic pipes than in using the previously known technique.

The method according to the invention also makes it possible to accomplish the forming operation in a shorter period of time than according to the previously known technique in that the mandrel is in a preferred embodiment of the method according to the invention pushed into the mould ring while this is fixed in a position opposite to the mandrel and in that the mandrel is thereupon in one and the same movement displaced into the softened pipe end portion for forming the end portion to a socket. The mould ring is pushed into the socket in a separate step of operation as described above, i.e. while the socket formed from the pipe end portion is retained in a position supported on the mandrel substantially without any displacement in relation thereto. By the fact that the mould ring is positioned on the mandrel at the same time as the mandrel is introduced into the pipe end portion there is provided a substantial saving of time providing that the time necessary for conducting the forming operation is less according to the invention than according to the previously known technique.

The machine for forming an end portion of a plastic pipe according to the method of the invention comprises a mandrel and a device for displacing the mandrel and the softened pipe end portion in relation to each other into a position, in which the pipe end portion is supported on the mandrel, the machine being characterized by a device for axially pushing the mould ring into the pipe end portion supported on the mandrel in a softened condition substantially without axial displacement of the pipe end portion along the mandrel.

The invention is described in the following with reference to the accompanying drawings.

DESCRIPTION OF THE PREFERRED EMBODIMENTS

Figure 7:
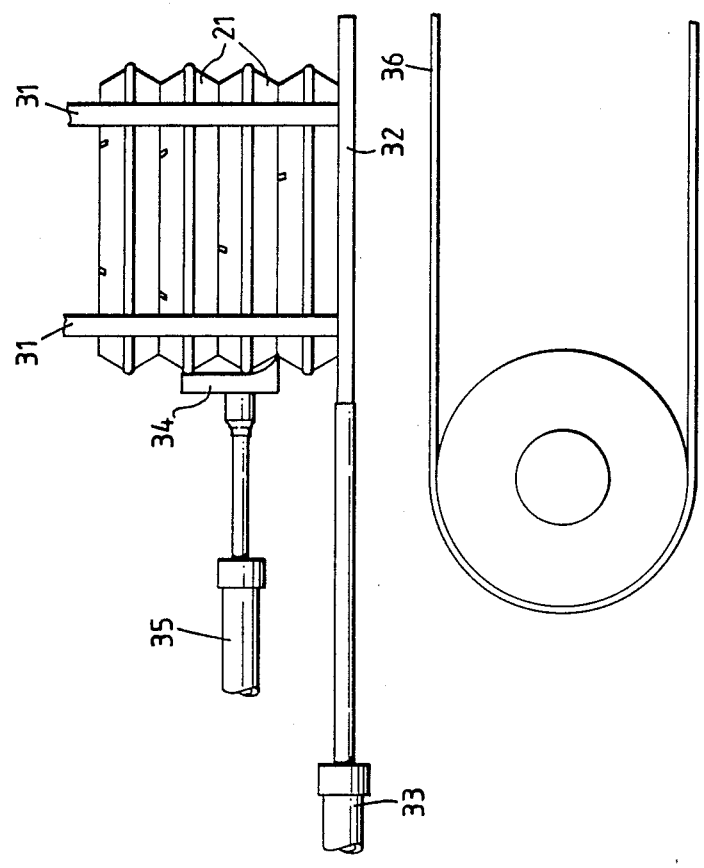
FIG. 7 shows a modified embodiment of a portion of a machine shown in FIGS. 1–6.

The machine according to the invention shown in the drawings is used for forming according to the method of the invention an end portion of a pipe of thermoplastic material, e.g. polyvinyl chloride. The pipe is preferably manufactured by continuous extrusion and cutting to desired length. In the machine shown in the drawings, the cut pipe lengths are provided with a socket in which an inner groove is positioned. In addition, a sealing ring is positioned in the groove in order to permit tight connection of the pipe length with another pipe by introducing the spigot end thereof into the socket, the sealing ring thereby sealing the space between the inner surface of the socket and the outer surface of the spigot end.

The pipe arriving to the machine according to the invention is in its entirety designated with reference numeral 1 and can have a length of for example 6 meters. In the drawings only the end portions 2 and 3 of the pipe are shown. The pipe end portion 2 is intended to be formed into a socket and to be provided with a sealing ring in the machine. The machine according to the invention comprises a support of which only the elements 4 and 5 are schematically shown in the drawings. The support element 4 supports a piston and cylinder unit 6 comprising a piston rod 7 supporting an axially displaceable forming mandrel assembly 8.

The forming mandrel assembly is in its entirety axially displaceable by means of the piston rod 7 of the piston and cylinder unit 6. The forming mandrel assembly 8 comprises a support plate 9 which is radially connected with the piston rod 7 and supports a forming mandrel 10 concentrically with the piston rod 7. The support plate 9 supports also a piston and cylinder unit 11 comprising a piston rod 12 which is connected with a support sleeve 13 displaceably positioned on the outer surface of the forming mandrel 10. Thus, it is possible to displace the support sleeve 13 axially along the forming mandrel 10 by operating the piston and cylinder unit 11.

The forming mandrel 10 has a substantially cylindrical main outer surface portion 14, a substantially cylindrical end surface portion 15, a conial connection portion 16 between the outer surface 14 and the end surface portion 15 and a conical end portion 17 at the free end of the mandrel 10.

A number of schematically shown nozzles 18 are mounted in association with the mandrel 10 for supplying lubricant to the outer surface of the mandrel.

The machine further comprises a magazine 19 having a number of compartments separated by partitions 20 and each containing one mould and sealing ring 21. The mould and sealing rings 21 are supported by a plate 22 positioned below the compartments of the magazine 19. The magazine 19 is displaceable in the direction shown by the arrow 23 so that the compartments are successively taking a position outside the supporting plate 22 and above funnel 24 which successively receives the mould and sealing rings 21 as a consequence of the displacement of the magazine in the direction of the arrow 23.

Figure 1A:
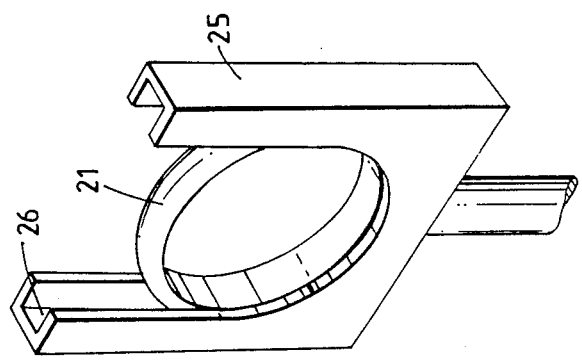
FIGS. 1–6 show the method and the machine according to the invention in different steps of forming an end portion of a plastic pipe.

In connection with the lower end of the funnel 24 there is positioned a substantially U-shaped retainer device 25. The retainer device 25 is schematically shown in perspective in FIG. 1a and forms an inner groove 26 for receiving a mould and sealing ring. In FIG. 1 there is shown a mould and sealing ring 21a positioned in the groove 26 of the retainer device 25 which mould and sealing ring 21a has fallen down from the compartment of the magazine 19 positioned above the funnel 24.

The retainer device 25 is supported by a piston rod 27 of a piston and cylinder unit 28 connected with the support element 5. Thus, the retainer device 25 is displaceable in the vertical direction by operating the piston and cylinder unit 28.

The pipe 1 arrives to the machine from a heating device in which the end portion 2 of the pipe 1 has been heated to a softened state. The pipe 1 is aligned and supported in the machine by means of support devices (not shown) in a position in which the pipe 1 is axially opposite to the forming mandrel 10 on the opposite side thereof in relation to the retainer device 25 and the mould and sealing ring 21 supported thereby. The end portion 3 of the pipe 1 is positioned adjacent a stopping plate 29, the distance of the stopping plate 29 from the retainer device 25 and the mandrel 10 being adjustable with regard to the length of the pipe 1 so that the pipe end portion 3 will be positioned adjacent the stopping plate 29 when the pipe 1 arrives to the machine irrespectively of the length of the pipe.

The position of the machine as shown in FIG. 1 can be considered to constitute the starting position for the operation cycle of the machine. In this position the mandrel assembly 8 is in a retracted position, the support sleeve 13 is in a retracted position on the mandrel, the retainer device 21 with the mould and sealing ring 21a is axially opposite to the forming mandrel 10 and the pipe 1 with the pipe end portion 2 in a heated, softened condition is positioned axially opposite to the mandrel 10.

When the machine is in the position of FIG. 1 the piston and cylinder unit 6 is actuated for displacing the piston rod 7 and the forming mandrel assembly 8 supported thereby to the right as shown in FIG. 1 while the nozzles 18 are at the same time activated for spraying a lubricant on the outer surface of the mandrel 10. Thereby, the forming mandrel assembly 8 is axially displaced through the mould and sealing ring 21 supported by the retainer device 25 and into the softened pipe end portion 2 which is radially expanded to a shape and inner diameter corresponding to the shape and outer diameter of the mandrel 10. The displacement of the forming mandrel assembly 8 by means of the piston and cylinder unit 6 is interrupted in the position shown in FIG. 2, in which the end portion of the mandrel 10 has expanded the pipe and portion 2 to a socket 30 of predetermined axial length. The axial length of the socket 30 can be determined by detecting the introduction of the mandrel in the pipe end portion, for example by the fact that the peripheral surface of the mandrel is at a predetermined place provided with an air discharge opening, the closing of said air discharge opening as a consequence of the introduction of the opening in the pipe end portion creating a signal making the piston and cylinder unit 6 inoperative. When the mandrel 10 is introduced into the pipe end portion 2 the pipe 1 is displaced to a position in which the pipe end portion 3 engages the stopping plate 29 in order to fix the position of the pipe 1 in the axial direction. This fixing of the position can be provided also in other ways, for example by means of clamping jaws clamping around the pipe adjacent the pipe end portion 2.

Figure 2:
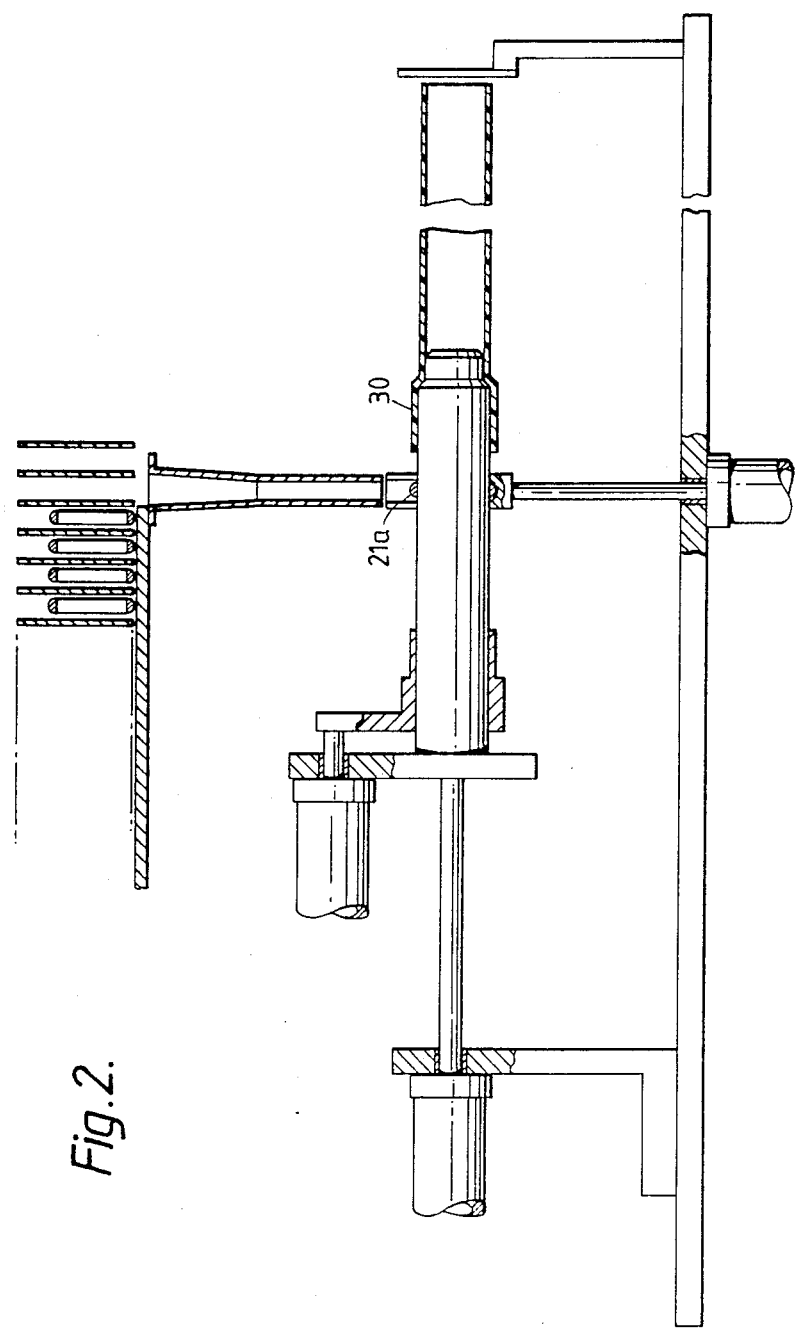
Figure 3:
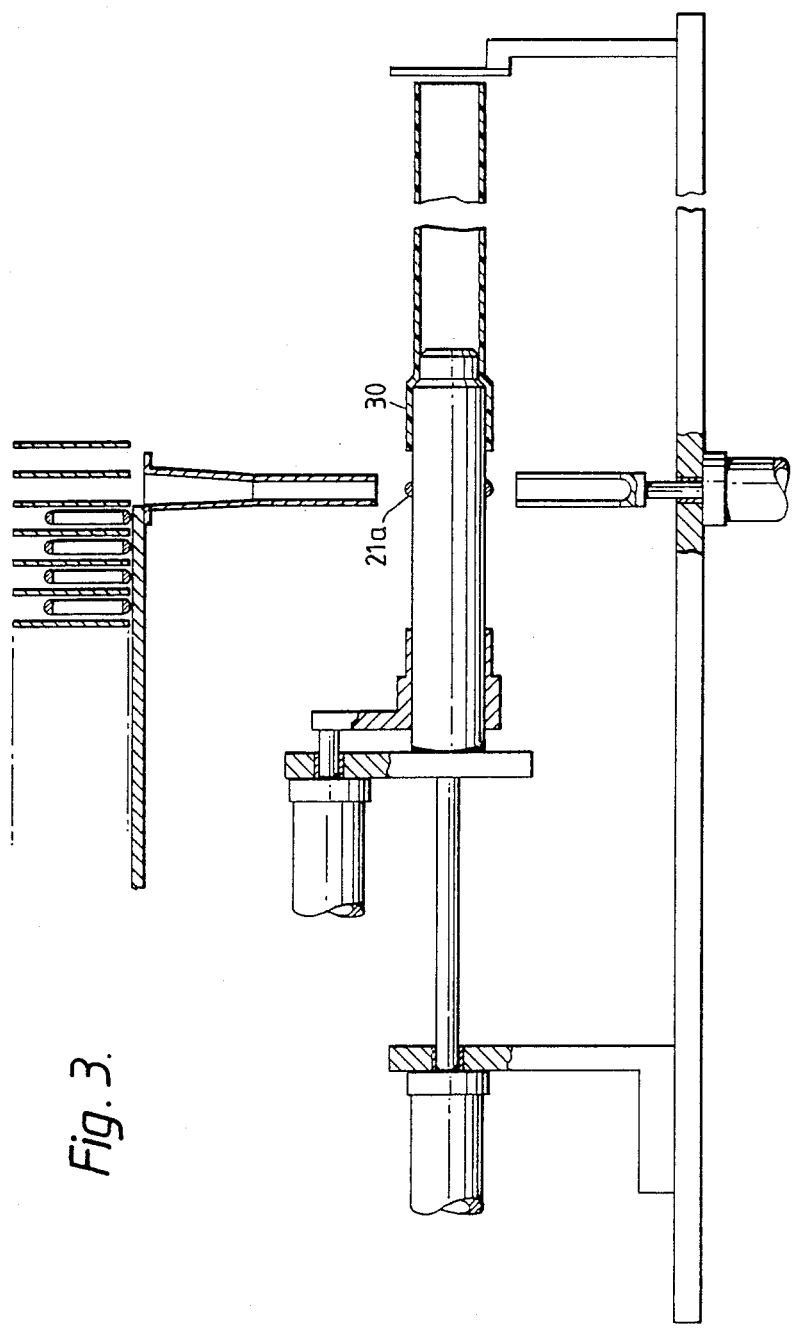
Figure 4:
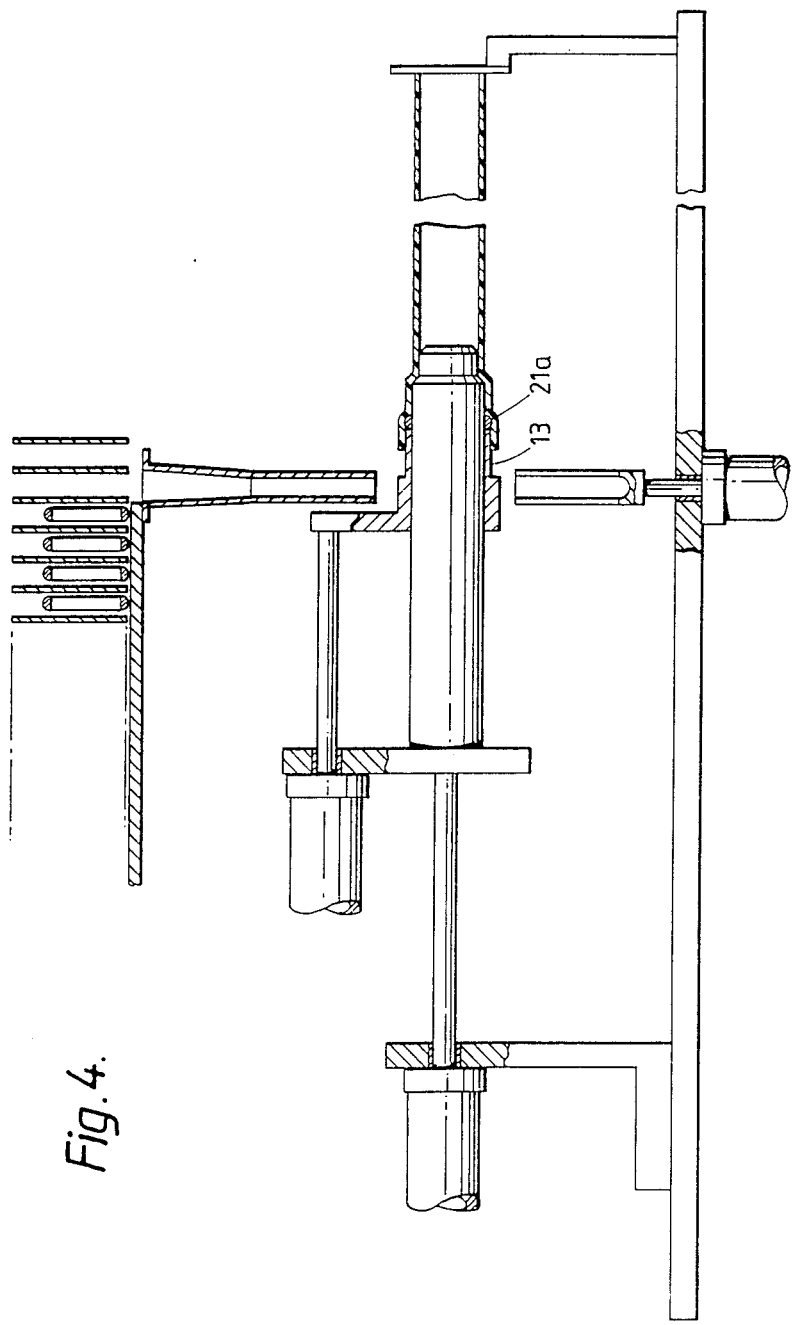

After the mandrel 10 has reached the position of FIG. 2 in which the mandrel 10 has moved through the mould and sealing ring 21a and has been introduced into the pipe end socket 2, the piston and cylinder unit 28 is actuated so as to displace the retainer device 25 downwards according to FIG. 3 to a position at a distance from the mandrel 10 and the mould and sealing ring 21a.

During the next step of operation the piston and cylinder unit 11 is actuated for displacing the support sleeve 13 on the mandrel 10 to the right as shown in the drawings. When the leading edge of the support sleeve 13 contacts the mould and sealing ring 21a positioned on the cylindrical outer surface 14 of the mandrel 10 the mould and sealing ring 21a is pushed in front of the support sleeve 13 during the continued displacement thereof. When the mould and sealing ring 21a arrives to the pipe end portion 2 expanded to the socket 30 and still in a softened state the mould and sealing ring 21a is pushed into the pipe end portion 2 while the wall thereof is formed for constituting an inner groove in the socket 30 for retaining the mould and sealing ring 21a. According to the present invention the introduction of the mould and sealing ring 21a' into the pipe end portion 2 is conducted while the pipe end portion 2 is in a position supported on the mandrel but substantially without any relative axial displacement between the mandrel 10 and the pipe end portion 2. In order to provide an additional fixing of the pipe end portion in relation to the surface of the mandrel 10 while the mould and sealing ring 21 is introduced into the pipe end portion 2 there can be used outer, additional jaws (not shown) for clamping the pipe end portion towards the mandrel or vaccum for suctioning the pipe end portion to the mandrel by providing the surface 14 of the mandrel 10 with openings (not shown) put under vacuum.

By expanding the pipe end portion 2 for forming the socket 30 and introducing the mould and sealing ring 21a in the socket thus formed in two separate steps there is exerted on the wall of the pipe 1 which is in a softened condition in the area of the end portion 2 and the adjacent portion of the pipe a rather restricted axial force obviating the risk of such deformation of the pipe wall, for example so that the wall is corrugated, that would otherwise appear when using the previously known technique and leading to substantial rejections.

Figure 5:
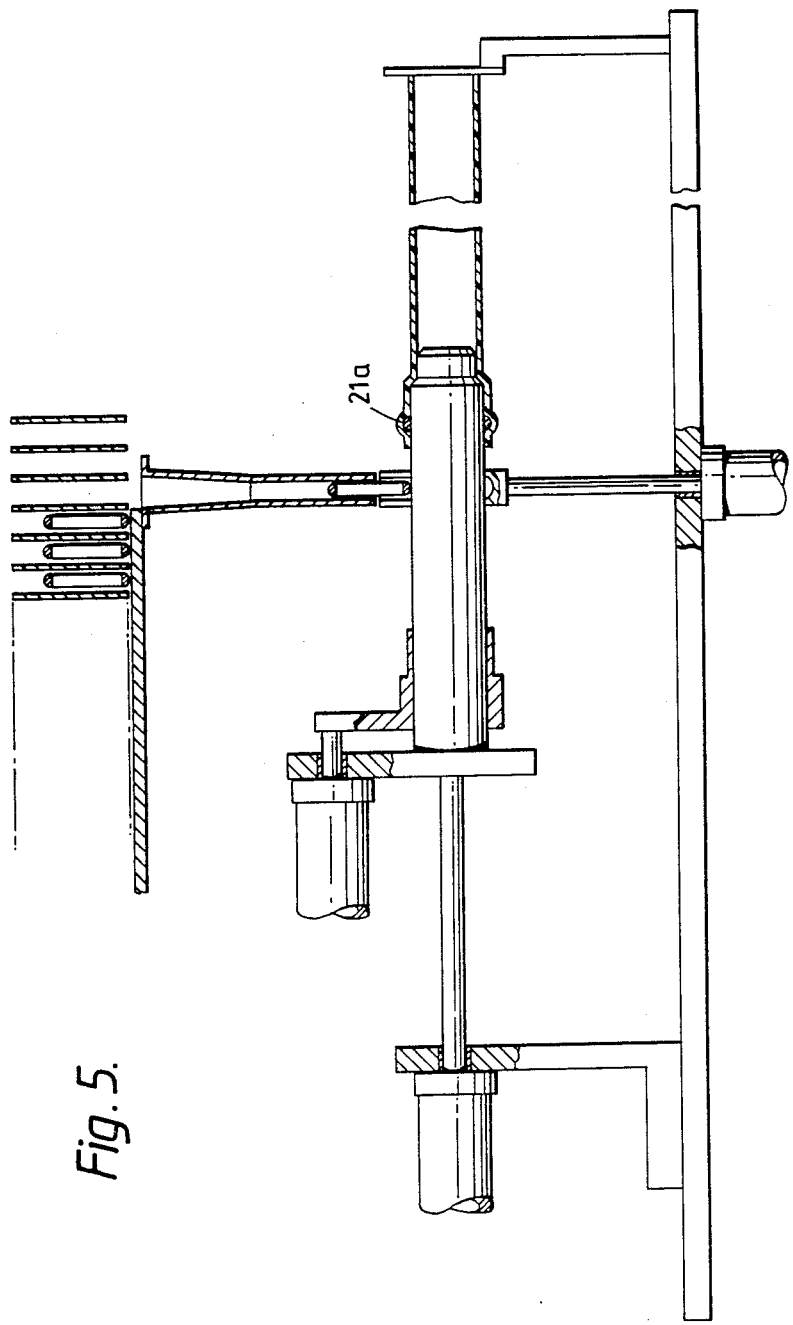

In the next step of operation the piston and cylinder unit 11 is actuated so as to withdraw the support sleeve 13 from the pipe end portion 2 expanded to a socket 30 while leaving the mould and sealing ring 21a in the socket 30. Thereby it may be suitable to suction the portion of the socket 30 in which the support sleeve 13 has been positioned towards the surface 14 of the socket 10 by means of openings (not shown) which are put under vacuum. After the support sleeve 13 has been withdrawn from the socket 30, the socket 30 and the adjacent portion of the pipe 1 are cooled for being transferred from the softened state to the solid state. The piston and cylinder unit 28 is at the same time actuated for returning the retainer device 25 to its upper position. In connection therewith, the magazine 19 is displaced one step to the right in order to supply to the funnel 24a a further mould and sealing ring 21b thereby falling down to a position in which it is supported by the surface of the mandrel 10. Thereby, the position of the machine shown in FIG. 5 has been reached.

Figure 6:
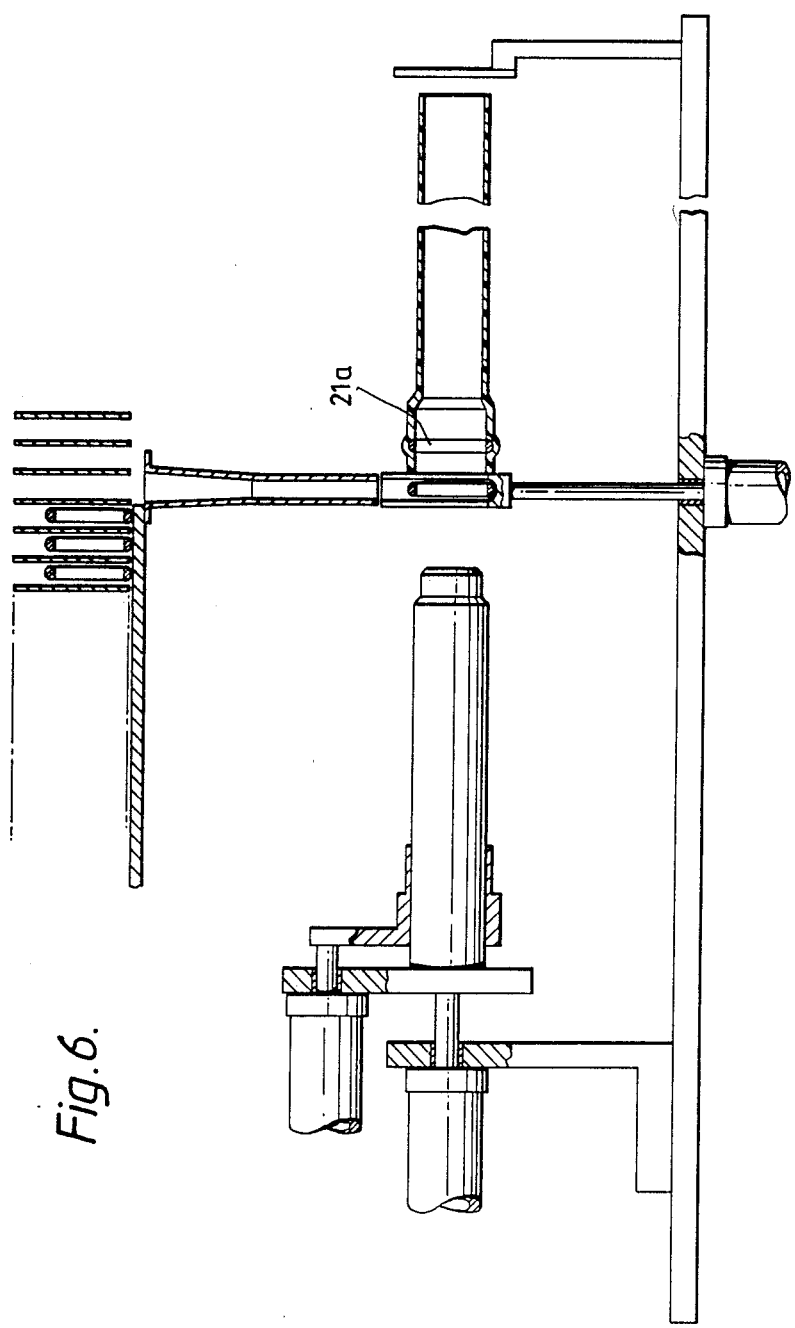

The next step of operation is shown in FIG. 6 according to which the piston and cylinder unit 6 has been actuated for displacing the forming mandrel assembly 8 to the left in the figure for withdrawing the mandrel 10 from the socket 30 of the pipe 1. During the withdrawal of the mandrel 10 from the socket 30 the retainer device 25 forms a stopping surface engaged by the free end edge of the socket 30. When the mandrel 10 is withdrawn from the socket 30 the mould and sealing ring 21 is left in a locked-in position in the socket 30 so as to form a sealing ring when the pipe 1 is subsequently connected with another pipe by inserting a spigot end thereof in the socket 30.

After the pipe 10 has been removed from the machine and a new pipe having a heated softened end portion has been introduced in the machine the operational position of FIG. 1 has again been reached and a cycle of operation has been completed.

By selecting a suitable lubricant to be sprayed on to the mandrel 10 by means of the nozzles 18 it is possible to provide already in the described forming operation an internal lubrication of the socket facilitating the following pipe jointing. In such case it is preferable to use a lubricant which does not dry and to position in the pipe end portion a closure preventing a soiling of the lubricant during transportation and storing.

In FIG. 7 there is shown a modified embodiment of a magazine for storing and conveying mould and sealing rings 21 to the funnel 24 of the machine. In this embodiment the magazine is constituted by a revolver magazine having a number of vertical piles of horizontally positioned mould and sealing rings 21. In FIG. 7 there is shown the lower portion of a pile of mould and sealing rings, but it is recognized that in this embodiment the magazine can comprise a desired number of piles of mould and sealing rings, for example six or eight piles, which are successively moved to the position shown in FIG. 7.

In accordance with FIG. 7 the mould and sealing rings 20 are positioned between guide pins 31 which can be present in a number of four pins and are equally distributed around the pile of mould and sealing rings. Below the pile of mould and sealing rings there is positioned a support plate 32 on which the pile is resting. The support plate 32 is connected with a piston and cylinder unit 33 by means of which the support plate 32 is laterally retractable from the position shown in FIG. 7. Above the support plate 32 and the piston and cylinder unit 33 there is provided a clamping device 34 which by means of a piston and cylinder unit 35 is displaceable to and from clamping engagement with the mould and sealing ring of the pile which is positioned next to the lowest mould and sealing ring resting on the support plate 32.

Below the magazine there is positioned a conveyor belt 36 extending up to the funnel 24.

For feeding a mould and sealing ring 21 to the funnel 24 the clamping device 34 is initially actuated for engaging the mould and sealing ring 21 of the pile next to the lowest ring thereof. Thereupon, the support plate 32 is retracted by actuating the piston and cylinder unit 33, whereby the lowest mould and sealing ring 21 of the pile falls down onto the conveyor belt 36 which conveys the mould and sealing ring to the funnel 24 in which the rings falls down. After the support plate 32 has returned to its position below the pile of mould and sealing rings the clamping device 34 is retracted, the pile thereby falling down on the support plate 32 whereby the operational position shown in FIG. 7 has again been reached.

The invention can be modified within the scope of the following claims. For example, it is possible to use the method and the machine according to the invention for forming pipe end portions merely by inserting a mould and sealing ring into the softened pipe end portion substantially without expanding the pipe end portion to a socket. However, also in this embodiment the introduction of the mould and sealing ring into the pipe end portion is conducted while the pipe end portion is in a softened state supported on a mandrel without being axially displaced in relation thereto. This method can be used for example for manufacturing pipe connector sleeves and pipe connector elements. In this modification of the method and the machine according to the invention it is possible to transfer the pipe end portion from the solid to the softened state after positioning the pipe end portion on the mandrel. Also in other respects it is possible to modify the method and the machine according to the invention within the scope of the following claims.

I claim:

1. A machine for forming an end portion of a thermoplastic pipe comprising:
   a mandrel having a cylindrical outer surface;
   means for moving the cylindrical outer surface of said mandrel axially into an axially aligned and heated pipe end portion to radially expand the pipe end portion;
   retainer means for positioning a mold and sealing ring axially between said mandrel and the heated pipe end portion prior to displacement of said mandrel into the pipe end portion; and
   movable sleeve means disposed around said mandrel for displacing said ring along said mandrel outer surface while said mandrel is in said heated pipe end portion to radially expand the pipe end portion to thereby form a groove therein.

2. A machine as set forth in claim 1 which further comprises means for supplying lubricant to said mandrel prior to displacement into a pipe end portion.

3. A machine as set forth in claim 1 which further comprises stop means for axially fixing the pipe end portion.

4. A machine as set forth in claim 3 wherein said stop means include a stopping surface for engaging an end of a pipe opposite said end portion.

5. A machine as set forth in claim 1 which further comprises a magazine for sequentially supplying the mold rings and a conveyor the mold rings from said magazine to said retainer means.

6. A machine as set forth in claim 5 wherein said magazine retains a plurality of vertically stacked mold rings and elements for dropping the rings individually onto said conveyor.

7. A machine for forming an end portion of a thermoplastic pipe comprising:
   a mandrel having a cylindrical outer surface;
   a piston and cylinder unit for axially displacing said mandrel into an axially aligned and heated end portion of the thermoplastic pipe for radially expanding the end portion;
   a retainer device for positioning a mold and sealing ring axially to said mandrel for mounting the mold and sealing ring about said mandrel during displacement of said mandrel into the pipe;
   a sleeve slidably mounted on said mandrel; and
   a piston and cylinder unit for axially displacing said sleeve along said mandrel to displace the mold and sealing ring along said mandrel into the pipe end portion while said mandrel is in said heated pipe end to radially expand the pipe end portion to thereby form a groove therein.

8. A machine as set forth in claim 7 wherein said retainer device is of U-shape to slidably receive a mold ring therein and is movable transversely of said mandrel.

9. A machine as set forth in claim 7 which further comprises a magazine for conveying a sequence of mold rings and a vertically disposed funnel for sequentially delivering the mold rings to said retainer.

10. A machine as set forth in claim 7 wherein said mandrel outer surface has a cylindrical end surface portion, a cylindrical main surface portion and a conical portion between said cylindrical portions.

11. A machine as set forth in claim 10 further comprising means for supplying lubricant onto said mandrel portions.

* * * * *